United States Patent
O'Neill et al.

(10) Patent No.: US 12,506,815 B2
(45) Date of Patent: Dec. 23, 2025

(54) MANAGING ACCESS ACROSS A CLOUD BOUNDARY

(71) Applicant: Juniper Networks, Inc., Sunnyvale, CA (US)

(72) Inventors: Charles Damian O'Neill, Ballymena (GB); Antoine Sibout, Barcelona (ES); Hayden Paul Shorter, Bangor (GB)

(73) Assignee: Juniper Networks, Inc., Sunnyvale, CA (US)

( * ) Notice: Subject to any disclaimer, the term of this patent is extended or adjusted under 35 U.S.C. 154(b) by 71 days.

(21) Appl. No.: 18/464,083

(22) Filed: Sep. 8, 2023

(65) Prior Publication Data

US 2025/0088572 A1    Mar. 13, 2025

(51) Int. Cl.
*H04L 67/61*    (2022.01)
*H04L 41/5006*    (2022.01)
*H04L 47/25*    (2022.01)

(52) U.S. Cl.
CPC .......... *H04L 67/61* (2022.05); *H04L 41/5006* (2013.01); *H04L 47/25* (2013.01)

(58) Field of Classification Search
CPC ...... H04L 67/61; H04L 41/5006; H04L 47/25
See application file for complete search history.

(56) References Cited

U.S. PATENT DOCUMENTS

| | | | |
|---|---|---|---|
| 9,325,558 B2 | 4/2016 | Thang et al. | |
| 11,003,502 B2 | 5/2021 | Ahmed et al. | |
| 11,068,314 B2 | 7/2021 | Roy et al. | |
| 2015/0358251 A1 | 12/2015 | Varga et al. | |
| 2016/0182345 A1 | 6/2016 | Herdrich et al. | |
| 2019/0289082 A1* | 9/2019 | Furuichi | H04L 12/66 |
| 2021/0105338 A1* | 4/2021 | Oyman | H04L 67/61 |
| 2023/0031741 A1* | 2/2023 | Tomar | G06F 9/4843 |

OTHER PUBLICATIONS

Extended Search Report from counterpart European Application No. 24154807.2 dated Apr. 3, 2024, 7 pp.
"AppFormix: Realize the Performance of Your Cloud Infrastructure," Intel, 2016 (Applicant points out, in accordance with MPEP 609.04(a), that the year of publication, 2016, is sufficiently earlier than the effective U.S. filing date, so that the particular month of publication is not in issue.), 7 pp.
"Configure Quality of Service for Pods,", https://kubernetes.io/docs/tasks/configure-pod-container/quality-service-pod/, Last modified Aug. 24, 2023, 8 pp.
Response to Extended Search Report dated Apr. 3, 2024, from counterpart European Application No. 24154807.2 filed Sep. 12, 2025, 25 pp.

* cited by examiner

*Primary Examiner* — Joe Chacko
(74) *Attorney, Agent, or Firm* — Shumaker & Sieffert, P.A.

(57) ABSTRACT

This disclosure describes techniques for managing and/or regulating access, by applications executing in a cloud environment, to network resources operating outside of the cloud environment. In one example, this disclosure describes receiving, from a first application executing in a cloud environment, a first request to be delivered to an off-cloud network resource; receiving, from a second application executing in the cloud environment, a second request to be delivered to the off-cloud network resource; and managing, based on a policy, delivery of the first request and the second request to the off-cloud network resource.

18 Claims, 10 Drawing Sheets

MANAGING ACCESS ACROSS A CLOUD BOUNDARY

TECHNICAL FIELD

This disclosure relates to cloud computing systems, and more specifically, to techniques for managing computing resources inside and outside a cloud network.

BACKGROUND

Forms of resource reservation are often used to manage a pool of shared resources among multiple workloads in a network. Such techniques may involve rate limiting, buffering, and policing of shared use policies. These techniques can also be applied in a cloud networking context to prevent resource contention, service level agreement (SLA) violations, unpredictable performance, and security risks.

SUMMARY

This disclosure describes techniques for managing and/or regulating access, by applications executing in a cloud environment, to network resources operating outside of the cloud environment. In particular, techniques described herein may help ensure that applications executing in a cloud network do not negatively impact network resources operating in an off-cloud environment. Such off-cloud network resources may be, for example, networking equipment deployed in an on-premises network used by an organization or enterprise.

Applications executing in the cloud environment may perform occasional, regular, or frequent collection of data from resources in an off-cloud network for various purposes. Such purposes may include providing support services for or managing services executing on those off-cloud resources. Techniques described herein may minimize contention between multiple cloud-based applications accessing the same off-cloud resources. Such techniques may, correspondingly, also minimize cloud infrastructure costs incurred by the cloud-based applications executing within the cloud environment.

In some examples, this disclosure describes operations performed by a computing system in accordance with one or more aspects of this disclosure. In one specific example, this disclosure describes a method comprising receiving, by a network management system and from a first application executing in a cloud environment, a first request to be delivered to an off-cloud network resource; receiving, by the network management system and from a second application executing in the cloud environment, a second request to be delivered to the off-cloud network resource; and managing, by the network management system and based on a policy, delivery of the first request and the second request to the off-cloud network resource.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples of the disclosure are set forth in the accompanying drawings and the description herein. Other features, objects, and advantages of the disclosure will be apparent from the description and drawings, and from the claims.

DETAILED DESCRIPTION

Figure 1A:
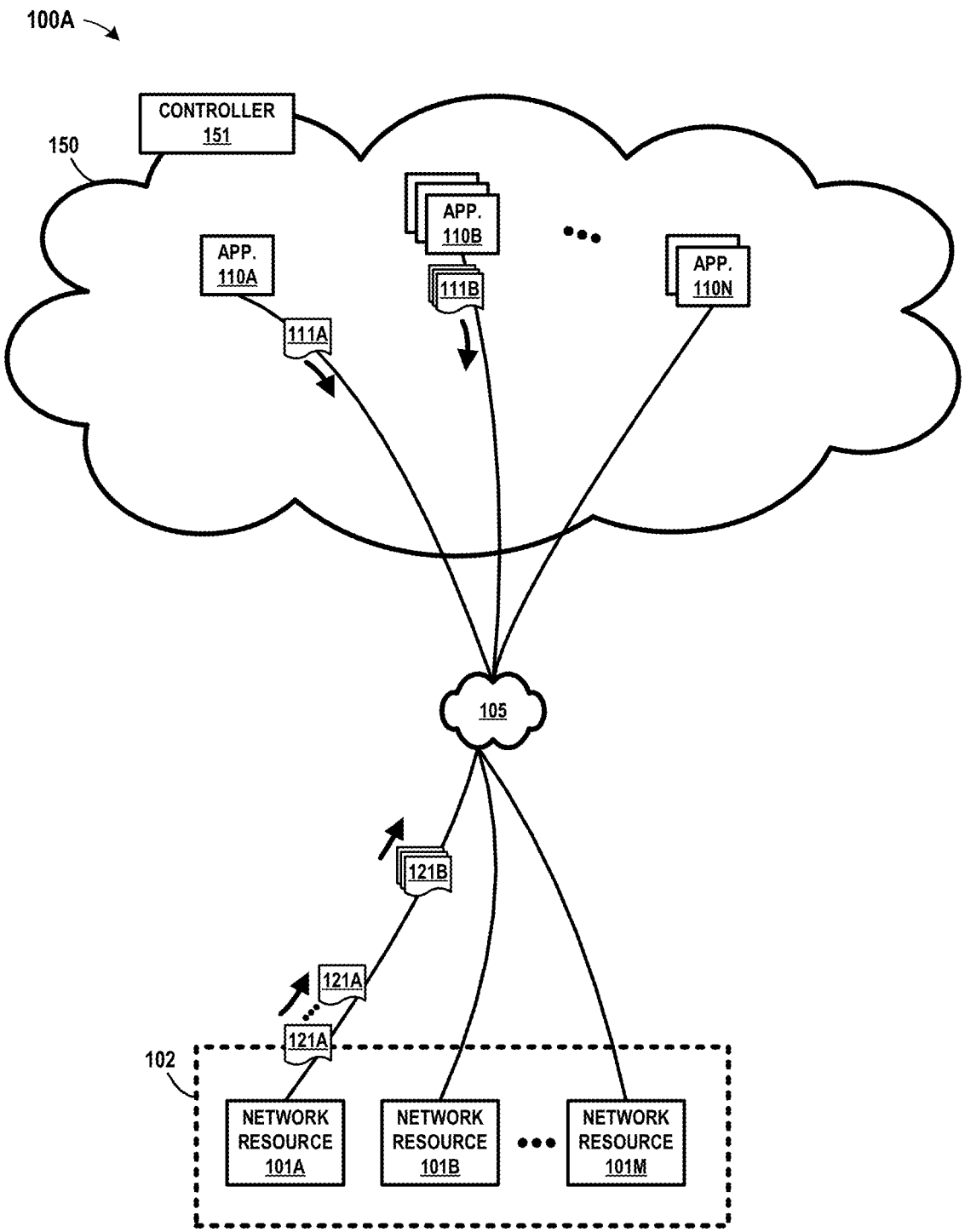
FIG. 1A is a conceptual diagram illustrating interactions between resources across multiple computer networks, in accordance with one or more aspects of the present disclosure.

FIG. 1A is a conceptual diagram illustrating interactions between resources across multiple computer networks, in accordance with one or more aspects of the present disclosure. Included within system 100A of FIG. 1A is cloud network 150 and off-cloud network 102. Cloud network 150 and off-cloud network 102 may communicate with each other through network 105.

Cloud network 150 may be a public or private cloud network that hosts physical and/or virtual computing systems. As shown in FIG. 1A, applications 110A through 110N ("applications 110," representing any number of applications) are deployed within cloud network 150. Also deployed within cloud network 150 is cloud controller 151, which may manage and/or administer aspects of cloud network 150, and may be responsible for provisioning, scaling, or otherwise adjusting infrastructure available to each of applications 110 within cloud network 150. Although shown as a single network in FIG. 1A, cloud network 150 may represent multiple cloud networks 150. In such an example, each of the cloud networks may be managed by a different entity and/or controller.

Applications 110 within cloud network 150 may perform operations and/or services on behalf of users or other systems located inside or outside of cloud network 150. Often, cloud-based applications are implemented through a collection of microservices. Accordingly, application 110A may be implemented through a single microservice, whereas other applications 110 may be implemented through multiple microservices. For example, applications 110B and 110N in FIG. 1A are illustrated as being composed of multiple microservices (i.e., each layer of applications 110B and 110N is intended to represent a separate microservice).

Off-cloud network 102 may be any public or private network that can be considered distinct from cloud network 150. Off-cloud network 102 may be a network maintained on-premises by an organization or enterprise. As illustrated in FIG. 1A, off-cloud network 102 includes network resources 101A through 101M ("network resources 101," representing any number of network resources). In some cases, off-cloud network 102 may be a local network implemented using network hardware from a network hardware vendor, where some or all of network resources 101 represent a physical network device (e.g., router, switch, firewall device, endpoint, node, or other network device) manufactured by and/or sourced from that network hardware vendor. In other cases, off-cloud network 102 may be a local network implemented using virtual execution elements instantiated using software provided by a network software vendor and executing on physical computing devices that may or may not be manufactured by and/or sourced from the network software vendor. In some cases, off-cloud network 102 may be a local network implemented using a combination of such network hardware and virtualized network elements/devices, which may be provided by a common network vendor. In such examples, off-cloud network 102 is constructed from network devices obtained by a customer of the network hardware vendor or network software vendor, and in that sense, off-cloud network 102 might be described as a "customer network." In general, however, network resources 101, as described herein, could be any appropriate network-enabled system, device, application, or other entity suitable for performing the techniques described herein.

Applications 110 executing within cloud network 150 may communicate with network resources 101 operating within off-cloud network 102 for various purposes. For example, one or more of applications 110 may perform operations relating to maintaining, monitoring, or otherwise managing network resources 101 within off-cloud network 102. In an example where off-cloud network 102 has been assembled from network hardware and/or software from a particular vendor, for instance, that vendor may manage or otherwise interact with its network devices, operating within off-cloud network 102, through one or more applications 110 executing within cloud network 150. As another example, applications 110 may be for services provided by third party entities not associated with the vendor or the customer. In general, communications between applications 110 and network resources 101 are primarily described herein as being for the purpose of applications 110 managing, monitoring, or maintaining aspects of network resources 101, such as to enable applications 110 to provide service(s) available from the cloud network 150 and commissioned by the customer. However, there are other purposes for which systems and/or applications within cloud network 150 may communicate with systems and/or applications within off-cloud network 102, and such purposes are intended to be encompassed by this disclosure.

Communications between applications 110 and network resources 101 may take place over network 105. Network 105 may be or may represent any appropriate communications infrastructure or platform through which cloud network 150 may communicate with off-cloud network 102. Accordingly, network 105 may be or may include or represent any public or private communications network or other network, including the internet. In some examples, cloud network 150 could be directly connected to off-cloud network 102, potentially making network 105 unnecessary.

In operation, one or more of applications 110 executing within cloud network 150 may request information from a network resource 101 operating within off-cloud network 102. For instance, in an example that can be described in the context of FIG. 1A, application 110A outputs request 111A over network 105. When network resource 101A receives request 111A, the request may be passed to a first software agent executing on network resource 101A that is responsible for servicing such requests, e.g., where the first software agent was previously installed on network resource 101A and is associated with application 110A. In one example, network resource 101A receives request 111A over network 105 and determines that it corresponds to a request to stream telemetry data from network resource 101A over network 105 to application 110A. In response, network resource 101A starts streaming telemetry data by periodically collecting the requested information and outputting the data (as a series of responses 121A) to application 110A over network 105. Application 110A receives the stream of responses 121A over network 105 and processes the telemetry data included within the responses 121A. In some examples, telemetry data may include metrics, information that enables provision of support services, information enabling management of services executing network resources executing within network 102, and/or information about internal resource utilization of network resource 101A, such as CPU utilization.

Other applications 110 may also request information from network resource 101A. For instance, still referring to FIG. 1A, application 110B outputs request 111B over network 105, and network 105 forwards request 111B to network resource 101A. Network resource 101A receives request 111B and (e.g., via the same software agent or via a second software agent executing on network resource 101A that is responsible for servicing requests from application 110B), responds with response 121B. Similarly, and in general, application 110N may output a request (not specifically shown in FIG. 1A) over network 105, and network resource 101A may receive the request and respond appropriately.

In the example being described, multiple applications 110 executing within cloud network 150 may be requesting information from or otherwise placing demands on one or more specific network resources 101 within off-cloud network 102. In some cases, requests made by applications 110 may become too burdensome for network resource 101A. For instance, if application 110B issues a large number of requests 111B to network resource 101A, network resource 101A may need to devote significant computing resources to process all of the requests 111B. If the requests 111B are too numerous, network resource 101A may begin experiencing high utilization, which may affect its ability to continue streaming telemetry data to application 110A on a timely basis.

In general, if applications 110 executing within cloud network 150 are allowed to request or otherwise interact with network resources 101 operating within off-cloud network 102 without constraints, a number of negative effects may result. For example, if applications 110 are competing for responses from the same resources of off-cloud network 102 (e.g., any of network resources 101), resource contention and potential bottlenecks may result in off-cloud network 102, cloud network 150, or elsewhere. Also, the performance of network resources 101 operating within off-cloud network 102 may become unpredictable, leading to degraded performance and potential downtime for the applications. Where service level agreements are be in place for various resources within system 100, violations of such service level agreements might occur if resources are unable to provide the expected level of performance and availability. Further, unrestricted access to network resources 101 by applications 110 may pose security risks, as such unfettered access may allow or enable unauthorized access to sensitive data and resources. In addition, without proper resource management and optimization, there may be unnecessary resource usage and costs (including use of cloud resources), leading to increased expenses for an organization managing off-cloud network 102 or contracting for services provided by cloud network 150.

One way to prevent these negative effects is to constrain usage of shared resources that exist outside of cloud network 150. Such constraints may help to ensure optimal performance, reliability, and security of the resources and better compliance with quality of service requirements and service level agreements. In particular, usage constraints may be applied to applications 110 executing within cloud network 150 to regulate, coordinate, and/or manage usage by applications 110 of network resources 101 operating within off-cloud network 102. Moreover, as described in connection with FIG. 2, shared resource usage constraints may be applied to systems and/or applications within both cloud network 150 and off-cloud network 102.

Figure 1B:
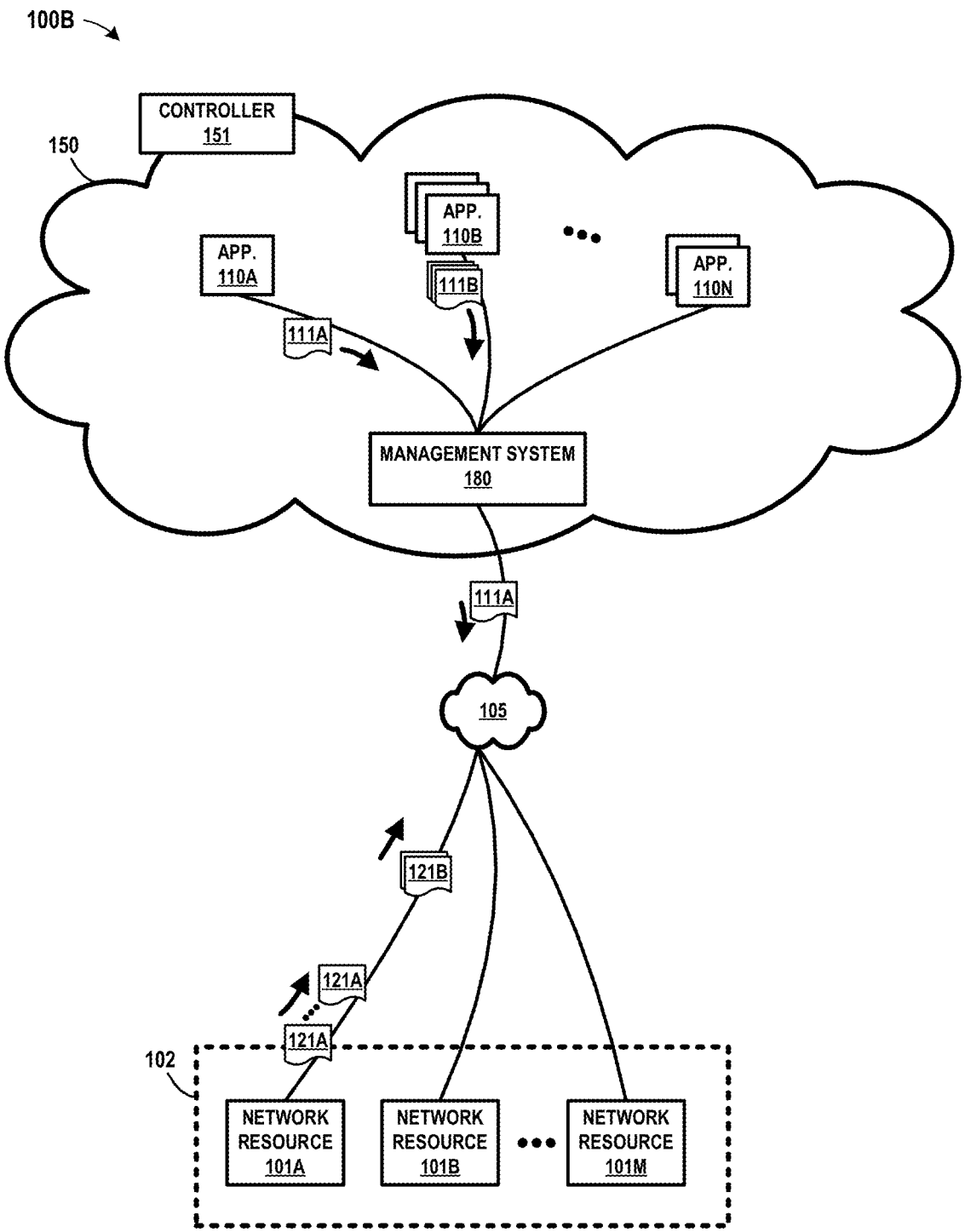
FIG. 1B is a conceptual diagram in which usage constraints are applied to interactions between resources across multiple computer networks, in accordance with one or more aspects of the present disclosure.

FIG. 1B is a conceptual diagram in which usage constraints are applied to interactions between resources across multiple computer networks, in accordance with one or more aspects of the present disclosure. System 100B of FIG. 1B includes many of the same elements of system 100A described in connection with FIG. 1A, and elements illustrated in FIG. 1B may correspond to earlier-described elements that are identified by like-numbered reference numerals in FIG. 1A.

One way in which system 100B differs from system 100A is that system 100B includes management system 180, which may be used to manage interactions between applications 110 executing within cloud network 150 and network resources 101 operating within off-cloud network 102. In some examples, management system 180 serves as a policy enforcement point that ensures that data flows across the boundary between cloud network 150 and off-cloud network 102 are consistent with policies and/or expectations of network actors, systems, owners, or other stakeholders.

Management system 180 may be implemented through any suitable means, including through a library implemented in another service or loaded into an existing software function, as a microservice included within another application (including one of applications 110), through a separate microservice, or otherwise. For example, management system 180 may be implemented by a service that manages connections from cloud network 150 to network resources 101 through a protocol, such as NETCONF. In general, however, management system 180 may be implemented by any appropriate computing system, including one or more server computers, workstations, mainframes, appliances, cloud computing systems, and/or other computing device that may be capable of performing operations and/or functions described in accordance with one or more aspects of the present disclosure. Management system 180 may represent a cloud computing system, server farm, and/or server cluster (or portion thereof) that provides services to client devices and other devices or systems. Although illustrated in FIG. 1B as a single system, management system 180 may be implemented by multiple devices or system, and may be implemented across multiple environments. Further, although illustrated in FIG. 1B as being located within or part of cloud network 150, management system 180 might be implemented outside of (or otherwise not part of) cloud network 150.

In operation, management system 180 may determine an appropriate way to allocate access to network resources 101 among applications 110. For instance, in an example that can be described in connection with FIG. 1B, management system 180 collects information about how each of applications 110 is expected to use network resources 101 operating in off-cloud network 102. In some examples, management system 180 collects this information from an administrator of cloud network 150, or from a developer, owner, or operator of each application 110. Management system 180 determines, for each network resource 101 within off-cloud network 102, a policy to be used to regulate and/or manage interactions that network resources 101. Management system 180 may determine the policy in view of expected usage and traffic patterns, and in view of any quality of service requirements and/or service level agreements that are in place or that are established for any of the applications and/or resources of cloud network 150 and/or off-cloud network 102. The policies may employ resource allocation and scheduling techniques that prioritize critical applications 110 and allocate access based on the needs of those applications 110. For example, network resources 101 can be dynamically allocated to different applications 110 based on usage patterns and quality of service requirements, thereby helping to ensure that critical applications receive the necessary access to network resources 101 while preventing over-provisioning and wasted resources.

Management system 180 may evaluate requests 111 sent by applications 110 to off-cloud network 102. For instance, again with reference to FIG. 1B, application 110A outputs request 111A. Management system 180 receives the request and determines that it is a request intended for network resource 101A. Management system 180 evaluates request 111A and determines that request 111A complies with the policy for network resource 101A, and outputs request 111A over network 105. Network resource 101A receives request 111A over network 105 and determines that it corresponds to a request to stream telemetry data from network resource 101A over network 105 to application 110A. Network resource 101A starts streaming telemetry data over network 105 at the requested rate as a series of responses 121A. Application 110A receives the stream of responses 121A over network 105 (e.g., through management system 180). Application 110A processes the telemetry data included within the responses 121A.

Management system 180 may also enable application 110B to send a request to network resource 101A. For instance, still referring to FIG. 1B, application 110B outputs request 111B. Management system 180 receives request 111B and determines that it is a request intended for network resource 101A. Management system 180 evaluates request 111B and determines that it complies with the policy for network resource 101A. Management system 180 outputs request 111B over network 105. Network resource 101A processes the request and responds with response 121B.

Management system 180 may eventually constrain usage of network resource 101A by application 110B. For instance, again referring to FIG. 1B, application 110B outputs additional requests 111B. Management system 180 receives the additional requests 111B (e.g., as a series of requests 111B) and determines that each is a request intended for network resource 101A. Management system 180 evaluates whether the series of request 111B would negatively impact the operation of network resource 101A or would be inconsistent a policy in place for usage of network resource 101A. If management system 180 determines that the series of requests 111B would negatively impact the operation of network resource 101A (or violate a policy), management system 180 may constrain the usage of network resource 101A by application 110B (or application 110A). Management system 180 may do so by using data shaping or rate-limiting techniques to control the rate at which requests 111B are transmitted from application 110B in cloud network 150 to network resource 101A. Management system 180 may also use queuing techniques to store (e.g., temporarily hold) at least some of the requests 111B from application 110B, particularly where transmitting all of the requests 111B would overburden network resource 101A, or would cause congestion, delays, and/or cause dropped requests. Management system 180 may ultimately police requests 111B sent by application 110B by controlling the rate of the requests being sent to network resource 101A, which may involve dropping requests 111B that exceed a rate specified by a policy that applies to network resource 101A. By data shaping, queueing, and/or policing applied to requests 111 (i.e., requests 111A or 111B), management system 180 may be able prevent resource contention, and ensure network resource 101A operates consistently and productively.

Techniques described herein may therefore provide certain technical advantages. For instance, by constraining shared usage of off-cloud resources, instances of resource contention and potential bottlenecks in a system or within a network can be reduced. Further, such constraints may prevent unpredictable performance that may result from unconstrained use of network resources 101. Without constraints on applications 110, network resources 101 may also experience degraded performance, downtime and potential security risks. With constraints in place, better compliance with quality of service guarantees and service level agreements may result. Applying constraints on shared usage of resources may also reduce instances of unnecessary resource usage and costs. In addition, centrally and preemptively managing the usage constraints, by a system within the cloud network, may have advantages over an alternative in which constraints are applied to received usage requests by the network resources 101. While it may be possible to manage usage constraints by resources within off-cloud network 102, such an approach may be less efficient than other approaches described herein. For example, where network resources 101 in network 102 are being overburdened by interactions originating from applications 110, it may be difficult to source and/or engage additional resources within off-cloud network 102 to manage usage those usage constraints.

Figure 2:
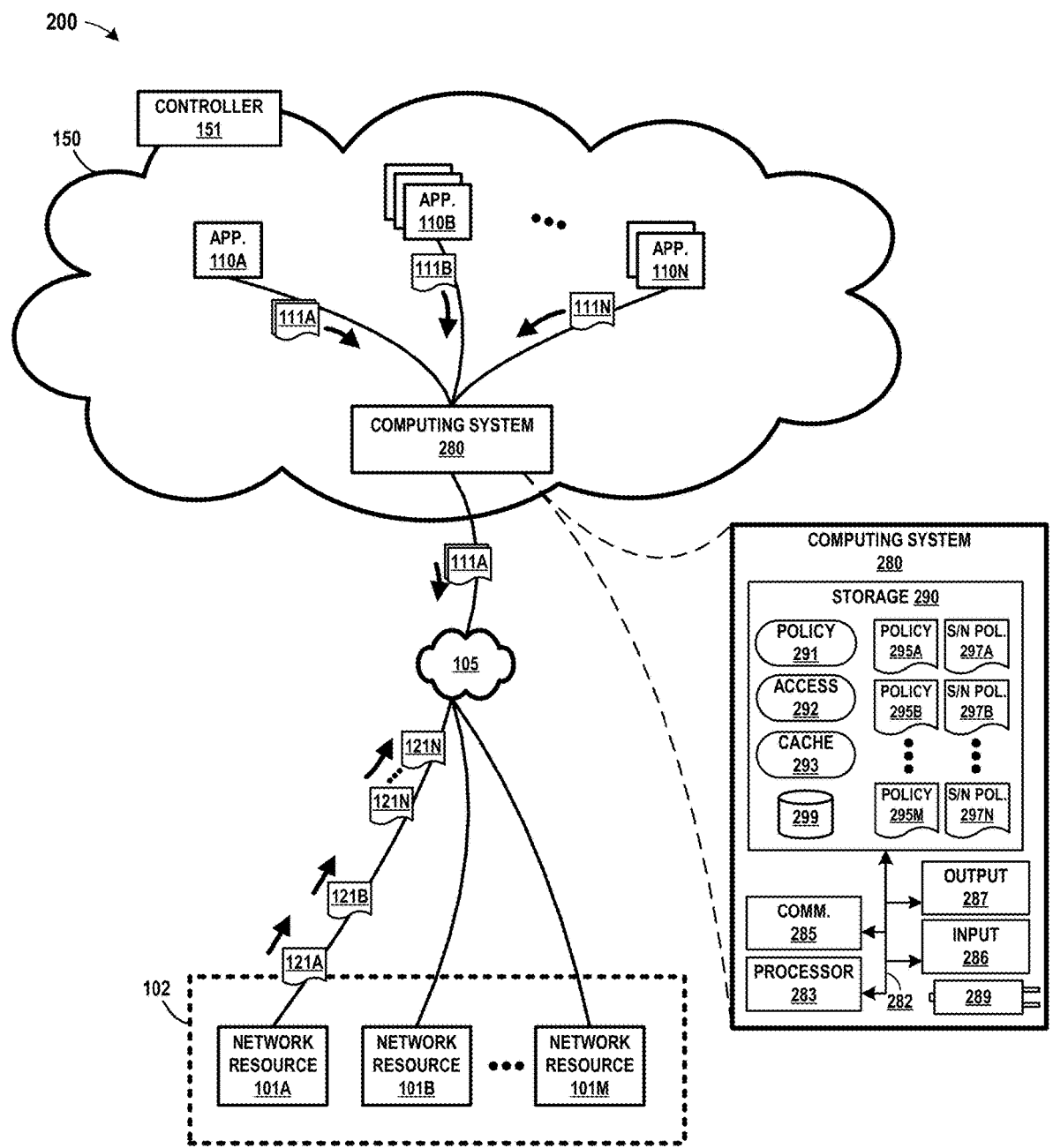
FIG. 2 is a block diagram illustrating an example system in which usage constraints are applied to interactions between resources across multiple computer networks, in accordance with one or more aspects of the present disclosure.

FIG. 2 is a block diagram illustrating an example system in which usage constraints are applied to interactions between resources across multiple computer networks, in accordance with one or more aspects of the present disclosure. System 200 of FIG. 2 includes many of the same elements of systems 100A and 100B described in connection with FIGS. 1A and 1B. Elements illustrated in FIG. 2 may correspond to earlier-described elements sharing the same reference numeral.

Also illustrated in FIG. 2 is computing system 280, which may be considered an example or alternative implementation of management system 180 of FIG. 1B. Computing system 280 is illustrated in FIG. 2 to facilitate a description of certain components, modules, and other aspects of a computing system that may implement a network management system, such as management system 180. Computing system 280 is also illustrated in FIG. 2 to facilitate a description of how such a computing system may operate in accordance with techniques described herein.

For ease of illustration, computing system 280 is depicted in FIG. 2 as a single computing system. However, in other examples, computing system 280 may be implemented through multiple devices or computing systems distributed across a data center, multiple data centers, or multiple cloud networks. For example, separate computing systems may implement functionality described herein as being performed by each of policy module 291, access module 292, or cache module 293 of computing system 280. Alternatively, or in addition, modules illustrated in FIG. 2 as included within computing system 280 may be implemented through distributed virtualized compute instances or virtual execution elements (e.g., virtual machines, pods, containers) of a data center, cloud computing system, server farm, and/or server cluster. Although shown operating within a single cloud network 150, computing system 280 may operate outside of cloud network 150, and may operate to manage and/or regulate communications between multiple cloud networks 150 and resources of off-cloud network 102.

In FIG. 2, computing system 280 is shown with underlying physical hardware that includes power source 289, one or more processors 283, one or more communication units 285, one or more input devices 286, one or more output devices 287, and one or more storage devices 290. Storage devices 290 may include policy module 291, access module 292, and cache module 293. One or more of the devices, modules, storage areas, or other components of computing system 280 may be interconnected to enable inter-component communications (physically, communicatively, and/or operatively). In some examples, such connectivity may be provided by through communication channels, which may include a system bus (e.g., communication channel 282), a network connection, an inter-process communication data structure, or any other method for communicating data. Although computing system 280 of FIG. 2 may be considered an example implementation of management system 180, other implementations are possible.

Power source 289 of computing system 280 may provide power to one or more components of computing system 280. Power source 289 may receive power from the primary alternating current (AC) power supply in a building, data center, or other location. In some examples, power source 289 may include a battery or a device that supplies direct current (DC). Power source 289 may have intelligent power management or consumption capabilities, and such features may be controlled, accessed, or adjusted by processors 283 to intelligently consume, allocate, supply, or otherwise manage power.

One or more processors 283 of computing system 280 may implement functionality and/or execute instructions associated with computing system 280 or associated with one or more modules illustrated herein and/or described herein. One or more processors 283 may be, may be part of, and/or may include processing circuitry that performs operations in accordance with one or more aspects of the present disclosure.

One or more communication units 285 of computing system 280 may communicate with devices external to computing system 280 by transmitting and/or receiving data, and may operate, in some respects, as both an input device and an output device. In some or all cases, communication unit 285 may communicate with other devices or computing systems over a network.

One or more input devices 286 may represent any input devices of computing system 280, and one or more output devices 287 may represent any output devices of computing system 280. Input devices 286 and/or output devices 287 may generate, receive, and/or process output from any type of device capable of outputting information to a human or machine. For example, one or more input devices 286 may generate, receive, and/or process input in the form of electrical, physical, audio, image, and/or visual input (e.g., peripheral device, keyboard, microphone, camera). Correspondingly, one or more output devices 287 may generate, receive, and/or process output in the form of electrical and/or physical output (e.g., peripheral device, actuator).

One or more storage devices 290 within computing system 280 may store information for processing during operation of computing system 280. Storage devices 290 may store program instructions and/or data associated with one or more of the modules described in accordance with one or more aspects of this disclosure. One or more processors 283 and one or more storage devices 290 may provide an operating environment or platform for such modules, which may be implemented as software, but may in some examples include any combination of hardware, firmware, and software. One or more processors 283 may execute instructions and one or more storage devices 290 may store instructions and/or data of one or more modules. The combination of processors 283 and storage devices 290 may retrieve, store, and/or execute the instructions and/or data of one or more applications, modules, or software. Processors 283 and/or storage devices 290 may also be operably coupled to one or more other software and/or hardware components, including, but not limited to, one or more of the components of computing system 280 and/or one or more devices or systems illustrated or described as being connected to computing system 280.

Policy module 291 may perform functions relating to generating, managing, modifying, and storing various policies associated with managing data flows between cloud network 150 and off-cloud network 102. In some examples, policy module 291 manages and stores various policies 295 (as well as "south-to-north" policies 297) in storage device 290 and/or data store 299. In some examples, policy module 291 may create and/or register various policies based on information about expected usage, by applications 110, of any of network resources 101. Correspondingly, policy module 291 may create and/or register various policies based on information about expected volumes of data that are expected to be sent, by network resources 101, to any of applications 110 or other resources in cloud network 150.

In general, a policy refers to rules and guidelines governing how shared resources should be allocated and managed to meet the quality of service (QOS) requirements and to ensure optimal resource usage in a cloud environment. Policies may define specific constraints and requirements for using network resources and shared resources within the cloud environment. In some cases, they dictate how different applications should be granted access to these resources, how resources should be prioritized, and how resource usage should be monitored and controlled to prevent overloading and potential bottlenecks. Policies can be implemented at various points in system 200, such as at a policy enforcement point (e.g., computing systems 280), which is responsible for enforcing the policies to ensure compliance. Such a policy enforcement point can be used to monitor and control the use of resources and enforce access controls based on application-specific rules and policies. Policies may ensure that the network and shared resources are used effectively and efficiently, avoiding contention and providing reliable and predictable performance to meet the service level agreements.

In some cases, policies could define and be used to enforce a maximum number of requests per minute sent to a given network resource 101 by an application 110 (or by computing system 280). Policies could also define what functionality is enabled on a given network resource 101, or the amount of data available to be collected from that network resource 101. Some types of policies may define how cloud network 150 should interact with network resources 101 generically, and other policies may define how specific applications 110 should interact with a specific network resource 101.

Access module 292 may perform functions relating to applying usage restrictions on shared resources. In some examples, access module 292 enforces policies described in the preceding paragraphs. In particular, access module 292 may enforce restrictions on how applications 110 may use or consume resources of various network resources 101 operating in off-cloud network 102.

Cache module 293 may perform functions relating to caching data received from one or more off-cloud network resources for later use. Cache module 293 may store data associated with off-cloud network resources and use that data when responding to requests 111 issued by any of applications 110 within cloud network 150, without actually relaying the request to the off-cloud network resources. In some cases, a request 111 issued by a given application 110 executing within cloud network 150 can be serviced partially or entirely from cache storage (e.g., located within storage device 290 and managed by cache module 293).

Caching may reduce response time, since by caching frequently requested responses, subsequent requests for the same data can be served directly from the cache. This eliminates the need for the shared resource to receive and process the request again, thereby resulting in the reduced response time. Reduced response times facilitate compliance with SLAs by ensuring that the application receives a response within specified time constraints and that the shared resource can handle other requests within the specified time constraints.

Caching may also minimize resource utilization by reducing the workload on network resources 101 by offloading (or "in-sourcing") repetitive or redundant requests. When a cached response is served, the need for network resource 101 resource to perform the exact computations or fetch the data again is avoided. This helps optimize resource utilization and ensures that the shared resource can efficiently handle other requests, reducing the risk of resource contention and potential performance issues.

Caching can also enhance the scalability of network resources 101. As the number of requests increases, caching allows the shared resource to handle more requests without being overwhelmed. By serving cached responses, shared resources can effectively perform more requests, reducing the likelihood of SLA violations due to resource overload.

Still further, caching can improve the availability of the shared resource by reducing its dependency on the availability of the actual resource. For example, if a given network resource 101 experiences temporary unavailability or performance issues, cached responses can still be served, ensuring uninterrupted application service. This helps prevent downtime and contributes to meeting SLAs that specify a certain level of availability. To ensure that caching effectively supports SLA fulfilment, specific cache management processes may be employed, including cache invalidation processes to avoid state data from being used, cache size and replacement policies that ensure sufficient capacity is available to store frequently accessed data, and cache consistency policies that ensure data received from a cache consistent with data that would have otherwise been received from the original source, for example.

Data store 299 of computing system 280 may represent any suitable data structure or storage medium for storing information relating to policies, efforts to enforce policies, or other information. The information stored in data store 299 may be searchable and/or categorized such that one or more modules within computing system 280 may provide an input requesting information from data store 299, and in response to the input, receive information stored within data store 299. Data store 299 may be primarily maintained by policy module 291.

In operation, computing system 280 may receive information about one or more applications 110. For instance, in an example that can be described in the context of FIG. 2, communication unit 285 of computing system 280 detects input and outputs information about the input to policy module 291. Policy module 291 determines that the input corresponds to information about application 110A. In some examples, the information about application 110A identifies one or more network resources 101 that application 110A uses, monitors, or otherwise interacts with to perform operations or functions. The source of the input could be an administrator, an application owner (e.g., the "owner" of application 110A), or another source, such as a data store available to computing system 280. In the example being described, the information about application 110A identifies network resource 101A as a network resource that application 110A uses, monitors, or otherwise interactions with when application 110A executes within cloud network 150. The information about application 110A also specifies its requirements for network resource 101A, which may detail how application 110A expects to interact with network resource 101A, the amount data it will require of network resource 101A, the frequency such data will be required, which features of network resource 101A that will be used and/or should be enabled), minimum requirements for latency, and/or other information. In some examples, policy module 291 of computing system 280 may interact with cloud controller 151 to provision and/or scale infrastructure within cloud network 150 to enable application 110A to operate effectively based on operations expected to be performed by application 110A.

Computing system 280 may establish a policy for network resource 101A. For instance, continuing with the example being described in connection with FIG. 2, policy module 291 uses the information about application 110A to determine a service level agreement for application 110A, which may take the form of a contract between an owner/administrator of cloud network 150, computing system 280, and application 110A. The service level agreement may define expected performance characteristics and accessibility of network resource 101A, which will be enabled and/or managed through computing system 280. Such characteristics and accessibility information may specify factors such as responsiveness of network resource 101A to requests by application 110A, the refresh rate of data to be sent to application 110A by network resource 101A, maximum payload size, features of network resource 101A that available and/or enabled for application 110A, and how requests made by application 110A may be enforced using management techniques such as shaping, caching, and back-off protection. Based on the service level agreement for application 110A, policy module 291 generates policy 295A. Policy 295A reflects the how the demands placed on network resource 101A by one or more applications 110 (e.g., application 110A) will be managed. In the example being described, policy 295A will ultimately be enforced by access module 292 of computing system 280. Access module 292 uses policy 295A to ensure that applications 110 within cloud network 150 do not interact with network resource 101A so frequently that the ability of network resource 101A to operate effectively is impaired. Policy module 291 stores and/or registers policy 295A within data store 299.

Computing system 280 may apply policy 295A when enabling communications between application 110A and network resource 101A. For instance, still continuing with the example being described in the context of FIG. 2, communication unit 285 of computing system 280 detects input and outputs information about the input to access module 292. Access module 292 determines that the input corresponds to request 111A received from application 110A. Access module 292 further determines that request 111A is or includes a request by application 110A to interact with network resource 101A. In some examples, request 111A may represent a request, by application 110A, to receive configuration or telemetry information from network resource 101A, or request 111A may represent a request for other information. Access module 292 accesses policy 295A, which governs aspects of how application 110A may interact with network resource 101A. Access module 292 determines that request 111A complies with policy 295A. Access module 292 therefore causes communication unit 285 to transmit request 111A over network 105 to network resource 101A. Network resource 101A responds to the request by outputting response 121A over network 105. Communication unit 285 of computing system 280 receives response 121A and forwards response 121A to application 110A.

Computing system 280 may apply policy 295A to a series of requests 111A. For instance, again continuing with the example being described, communication unit 285 of computing system 280 detects input and outputs information about the input to access module 292. Access module 292 determines that the input corresponds to a series of requests 111A received from application 110A. Access module 292 applies policy 295A to determine how to process each request 111A in the series and to ensure that each request 111A in the series is processed in a manner consistent with policy 295A. In some examples, access module 292A may use data shaping or rate-limiting techniques to control the rate at which requests 111A are transmitted from cloud network 150 to network resource 101A. Access module 292A may use such shaping techniques to smooth out bursts of requests and to ensure that the rate of requests from application 110A conforms to policy 295A for network resource 101A. Alternatively, or in addition, access module 292A may use queuing techniques to store requests 111A from application 110A, particularly where transmitting all of the requests 111A would overburden network resource 101A, or would cause congestion, delays, and/or cause dropped requests. If application 110A issues requests 111A to network resource 101A too frequently, access module 292 may police the requests, pursuant to policy 295A, by controlling the rate of the requests being sent to network resource 101A. In some cases, access module 292 may control the rate of requests 111A being sent to network resource 101A by dropping requests that exceed a rate specified by policy 295A and/or that exceed available network capacity at a given time.

Computing system 280 may receive information about additional applications 110 that may use network resource 101A. For instance, still with reference to FIG. 2, communication unit 285 of computing system 280 detects input that policy module 291 determines corresponds to information about application 110B. The source of the input could be an administrator, the "owner" of application 110B, or another source. Policy module 291 further determines that the information identifies network resource 101A as a network resource that application 110B expects to use, monitor, or otherwise interact with when executing within 150. Policy module 291 uses the information to determine parameters for how application 110B is expected to use network resource 101A, and such parameters may be used to generate a service level agreement for application 110B, which may have the form of a contract between cloud network 150, computing system 280, and application 110B. Policy module 291 may interact with cloud controller 151 to provision cloud infrastructure for application 110B consistent with the service level agreement.

Computing system 280 may update policy 295A to account for use of network resource 101A by application 110B. For instance, again with reference to FIG. 2, policy module 291 determines, based on the information about application 110B, whether any changes are needed for policy 295A, given additional demands that application 110B may place on network resource 101A, as well as obligations already in place for network resource 101A, pursuant to policy 295A. Policy module 291 makes any appropriate changes to policy 295A, and stores and/or registers the updated policy 295A within data store 299. Policy module 291 may determine that the additional demands of application 110B could negatively impact network resource 101A by slowing network resource 101A or making network resource 101A less responsive or effective. In such a situation, policy module 291 may adjust policy 295A to ensure network resource 101A still can operate effectively with both applications 110A and 110B placing demands on network resource 101A. Such modifications may take place prior to application 110B being placed into production in cloud network 150. In other examples, policy 295A may be dynamically modified (after application 110B has been placed into production) based on observations about how network resource 101A performs in response to interactions with applications 110A and 110B. In either case, policy module 291 may adjust policy 295A by making policy 295A more or less restrictive with respect to servicing needs of applications 110.

In some cases, computing system 280 may consolidate aspects of how it controls and/or manages access to network resource 101A. In other words, policy module 291 may determine that there is some overlap in the needs and/or requirements of application 110A and application 110B. As an example, suppose that policy module 291 determines that application 110A is expected to request telemetry data from network resource 101A each minute (i.e., network resource 101A responds to a request 111A each minute with a response 121A), while application 110B is expected to request the same telemetry data from network resource 101A every three minutes (i.e., network resource 101A responds to a request 111B every three minutes with a response 121B). In such an example, policy module 291 may determine that the requests by both applications 110A and 110B can be merged, so that the less frequent requests by application 110B can be serviced by using data derived from the responses 121A that result from requests 111A. In some cases, policy module 291 may determine that some of requests 111A and/or 111B can be serviced using data expected to be stored within a cache managed by cache module 293 of computing system 280. In such an example, some requests can be serviced by computing system 280 without interacting with network resource 101A, through data previously stored within a cache or data store 299 of computing system 280. Accordingly, policy module 291 may consider the effect of the expected availability of cached data on demands made by applications 110A and 110B when updating or otherwise modifying policy 295A.

Computing system 280 may apply updated policy 295A. For instance, referring again to FIG. 2, communication unit 285 of computing system 280 receives a series of requests 111A from application 110A and a series of requests 111B from application 110B. For each such request 111, communication unit 285 outputs information about the request to access module 292. Access module 292 determines that each request 111 represents a request destined for network resource 101A. Access module 292 applies policy 295A to manage the flow of requests 111 being sent to network resource 101A over network 105. In doing so, access module 292 determines whether and how to apply data shaping, queuing, or policing operations on the requests 111. Access module 292 may, for some or all requests 111, cause cache module 293 to determine whether cached data is stored within 299 that enables requests to be fulfilled without interacting with network resource 101A over network 105. As a result of data management operations performed by access module 292, network resource 101A may operate efficiently, without being negatively impacted by the volume of requests 111 or other obligations imposed by application 110A or application 110B.

Computing system 280 may establish policies for other network resources 101 within off-cloud networks 102 that are used by applications 110 within cloud network 150. For instance, policy module 291 of computing system 280 may receive information about other applications 110 within cloud network 150 that will interact with various network resources 101 within off-cloud network 102. For each such network resource 101, an appropriate policy 295 may be established by policy module 291 that governs access, by applications 110 executing cloud network 150, to each specific network resource 101. Fore example, policy module 291 may follow procedures similar to those previously described with respect to network resource 101A to establish a policy 295B for network resource 101B. In such an example, policy 295B may be used to manage access to network resource 101B by applications 110 within cloud network 150. And in general, policy module 291 may follow similar procedures to establish policy 295M to manage and/or regulate access to network resource 101M by applications 110 within cloud network 150. Each such policy 295 (i.e., policies 295A through 295M) may be enforced by access module 292 of computing system 280. Accordingly, computing system 280 may serve as a policy enforcement point through which each request 111 and other traffic flows from applications 110 executing cloud network 150 to network resources 101 operating in off-cloud network 102.

When multiple applications 110 have potentially overlapping QoS requirements, policies associated with each application 110 may be merged to ensure that computing system 280 can provide the required level of QoS for all applications 110. This can be achieved by defining a set of rules that govern how the QoS policies of each application 110 should be combined. For example, if two applications 110 require a high priority for their requests, the QoS policy of a resource shared by the applications 110 should be set to prioritize requests by both applications 110. If one application 110 requires a high priority, and another requires a medium priority, computing system 280 should prioritize the high-priority requests and ensure that the medium-priority requests are not entirely blocked.

Merged policies may combine the required QoS, or alternatively, settle on a high denominator between policies depending how the merged policy is constructed. For example, if two applications 110 define a policy, which requires execution of a function after a given network resource 101 is rebooted, then these policies can be merged to execute this function once on behalf of both applications 110. A high denominator example may include a policy from application 110A which requires a function to run every 30 seconds, while application 110B defines a policy for the same function, requiring execution every 1 minute. The merged policy would run the function every 30 seconds, to satisfy both application 110A and application 110B.

It may also be appropriate for a default set of policies to be available and enabled for individual shared resources or other off-cloud network resources. These default policies may help ensure that shared resources are used efficiently and effectively in the absence of specific policies for individual applications 110 and/or network resources 101. Default policies may include request limitations, priority rules, and security measures to protect shared resources from access or misuse. Cloud controller 151, an administrator of cloud network 150, or another system or stakeholder could also customize the default policies for individual shared resources to match specific requirements better and optimize resource utilization. For example, a minimal set of functionality may be required by the system which translates to a minimum QoS for a given shared resource. This could include running certain functionality, or specific functions against a given network resource 101 at defined time periods. A default policy might ensure this is consistently supported, regardless of if the requirements of applications supersede these requirements or if no requirements are provided by the application.

Various schema languages may be employed to define the policies applied by access module 292 of computing system 280. Such languages may include user-defined Domain Specific Languages (DSL), using JSON, XML or YAML formats. And schemas targeted at related domains, such as XACML (extensible Access Control Markup Language), could be repurposed for this objective.

To effectively define and enforce policies within a policy enforcement point, the policy schema may need to be able to define concepts such as Rules, Policies, Policy Sets and Targets. Specifically, a "Rule" defines a condition or action that must be met or taken to comply with the policy. A "Policy" is a set of Rules that enforce a specific goal or requirement. "Policy Sets" are used to group related policies together, providing a way to manage policies at a higher level of abstraction. And "Targets" are criteria that define the context in which a policy or policy set should be applied. A target may include information such as the application's identity, the type of resource being requested, or the time the request is made (this list is not exhaustive).

In addition to these basic concepts, the policy schema may also need to support other features, such as the ability to define obligations and advice or reference external sources of information, such as common service endpoints or web services. For example, a sample document, illustrative of one possible format, might be represented as follows:

```
{
    "id": "example-policyset",
    "version": "1.0.0",
    "targets": [
        {
            "deviceInfo": [
                {
                    "family": "MX",
                    "model": "MX480",
                    "version": "18.2R1.9"
                }
            ]
        }
    ],
    "policies": [
        {
            "id": "policy-1",
            "effect": "install",
            "rules": [
                {
                    "id": "rule-1",
                    "condition": {
                        "script": { "$eq": "startup.script" }
                    }
                },
                {
                    "id": "rule-2",
                    "condition": {
                        "script": { "$eq": "cleanup.script" }
                    }
                }
            ]
        },
        {
            "id": "policy-2",
            "effect": "poll",
            "rules": [
                {
                    "id": "rule-3",
                    "condition": {
                        "timeOfDay": { "$between": ["9:00am", "5:00pm"] }
                    }
                },
                {
                    "id": "rule-4",
                    "condition": {
                        "statisticModelComponents": { "$eq": "get-interface-information" }
                    }
                }
            ]
        }
    ]
}
```

In various examples described herein with reference to FIG. 2, policies 295 are used to manage access, by applications 110 executing within cloud network 150, to network resources 101 operating within off-cloud network 102. In such examples, access module 292 manages such access by applying shaping, queueing, policing, and other network management techniques to requests 111 sent, by applications 110, to a given network resource 101 in off-cloud network 102. These examples apply a "north-to-south" management of data flow, at least in the sense that requests originating from cloud network 150 are managed and/or regulated as they are transmitted to off-cloud network 102. At least one objective of such management is to ensure that no one application 110 (or subset of applications 110) executing within cloud network 150 overconsumes resources of a specific network resource 101 operating in off-cloud network 102. Policies 295 are described as a way to ensure that the performance of each network resource 101 is not degraded or otherwise negatively impacted by applications 110.

However, similar techniques could apply to a "south-to-north" management of data flow. For instance, in another example that can be described in the context of FIG. 2, each of network resources 101A through 101M may stream or otherwise transmit a significant amount of data to a specific application 110 executing within cloud network 150, such as application 110N, for consumption and processing by that application. In one example, network resource 101A may be configured to stream data (e.g., streaming data 121N in FIG. 2) in response to a request 111N issued by application 110N. Similarly, other network resources 101B through 101M may also be configured to send data to application 110N. If the amount of data received by application 110N from various network resources 101 is sufficiently large, application 110N may experience high utilization, and may have trouble processing all of the data sent by the collection of network resources 101 within off-cloud network 102.

Accordingly, it may be appropriate for policy module 291 of computing system 280 to establish, for each of applications 110, appropriate south-to-north policies 297 to manage the flow of data sent by network resources 101 in off-cloud network 102 to a given application 110 executing in cloud network 150. In such an example, access module 292 might not only regulate the north-to-south flow of data pursuant to policies 295, but access module 292 may also regulate the south-to-north flow of data pursuant to south-to-north policies 297. For example, policy module 291 of computing system 280 may establish a south-to-north policy 297A that access module 292 uses to regulate access to (or data sent to) application 110A by network resources 101A to 101M of off-cloud network 102. Similarly, policy module 291 may establish south-to-north policy 297B that access module 292 uses to regulate access to application 110B by network resources 101A to 101M. And in general, policy module 291 may establish south-to-north policy 297N to regulate access to application 110N by network resources 101A to 101M.

In some respects, the purpose of the north-south management of data flow (by policies 295) is to minimize the impact that applications 110 executing within cloud network 150 could have on network resources 101 operating within off-cloud network 102. Correspondingly, the purpose of south-to-north management of data flow (by south-to-north policies 297) is to minimize the impact that network resources 101 operating within off-cloud network 102 could have on applications 110 executing within cloud network 150. Avoiding impacts on network resources 101 might be considered, in some cases, a higher priority than avoiding impacts on applications 110, particularly where off-cloud network 102 represents an enterprise, local, and/or customer network not designed to scale easily. Cloud network 150, on the other hand, might be expected to be capable of efficiently and dynamically scaling infrastructure so applications 110 can, on an as-needed basis, recruit additional infrastructure as demands on such applications 110 grow. However, scaling applications 110 still requires additional resources and is accompanied by a corresponding cost for those additional resources, so management of demands placed on applications 110, even within a scalable cloud environment, can still be important to manage and regulate. Accordingly, at least one purpose of south-north management of data flow is to minimize costs incurred by use of cloud network 150.

Modules illustrated in FIG. 2 (e.g., policy module 291, access module 292, cache module 293) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3A:
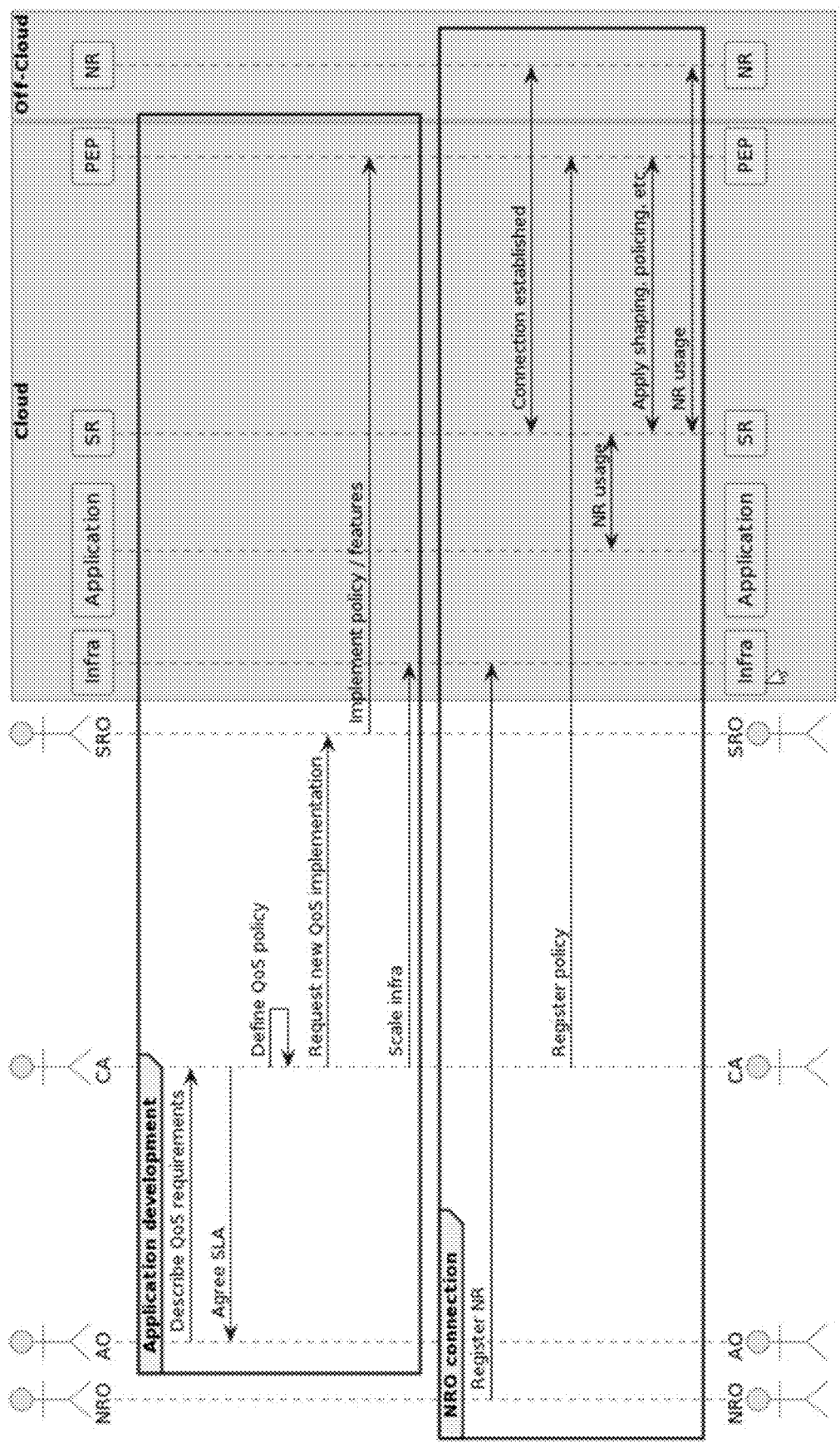
FIG. 3A is a conceptual diagram illustrating an example process for implementing a policy for constraining shared usage of limited resources outside of a cloud network, in accordance with one or more aspects of the present disclosure.

FIG. 3A is a conceptual diagram illustrating an example process for implementing a policy for constraining shared usage of limited resources outside of a cloud network, in accordance with one or more aspects of the present disclosure. FIG. 3A illustrates several steps, where each may be performed by any of several actors, including a network resource owner (NRO), an application owner (AO), a cloud administrator (CA), and a shared resource owner (SRO). These actors are referenced in FIG. 3A, and are described below. Although described in terms of human actors, at least some of these actors may be implemented through a computing system.

A network resource owner (NRO) may manage a specific network resource shared by multiple applications. Such management may include the connection to the cloud, the level of access afforded to the CA, etc. The NRO may work closely with the AO to ensure that the network resource is used effectively and efficiently and may also work with the CA to define policies and QoS requirements for the shared resource.

An application owner (AO) manages one or more applications 110 that run on cloud infrastructure (e.g., cloud network 150). The application owner may be responsible for defining QoS requirements and SLAs for their applications and monitoring application performance and resource utilization.

A cloud administrator (CA) manages the cloud infrastructure and ensures that shared resources are allocated efficiently and effectively. The cloud administrator may oversee tasks such as provisioning and de-provisioning network resources, managing access controls, and monitoring performance metrics to ensure that SLAs are met.

A shared resource owner (SRO) develops, provides, or is otherwise responsible for a specific shared resource (e.g., network resource 101) leveraged by one or more applications. The SRO will generally work with the CA to manage the deployment of the shared resource.

By working together, these actors can help to ensure that network resources are used effectively and efficiently while meeting the needs of all stakeholders. The CA can provide the necessary infrastructure and work with the SRO to provide the shared resources, while the AO and NRO can help define requirements and ensure that resources are used according to those requirements. This collaborative approach can maximize the value of network resources and improve the overall performance of cloud-based applications.

Referring now to the illustration of FIG. 3A, the AO describes, during the application development phase, the QoS requirements and the CA and SRO work to define a policy in the PEP and scale Infra as required. This process prepares the cloud network for when the Network Resource (NR) using this application is first connected. During the NRO connection phase, the NRO registers the Network Resource (NR) with the cloud infrastructure. The AO describes their Quality of Service (QOS) requirements for the NR, which can include aspects such as features to enable, frequency for tasks to run, minimum requirements for latency, performance etc. The Cloud Administrator (CA) agrees to the SLA (application development phase) and defines a QoS policy that reflects the requirements of the AO.

The CA registers the policy with a Policy Enforcement Point (PEP), which is responsible for enforcing the policy on the Shared Resource (SR). The PEP, which may be implemented through management system 180 of FIG. 1B or computing system 280 of FIG. 2, uses techniques such as shaping, policing, queueing, and prioritization to enforce the policy and ensure that the Application uses the NR according to the SLA. Throughout this process, analysis is performed to understand the current state of the resource and identify any potential sources of congestion. Overall, this solution involves a combination of QOS mechanisms and policies to ensure that the shared resource is used fairly and efficiently while meeting the needs of the different applications that rely on it.

Figure 3B:
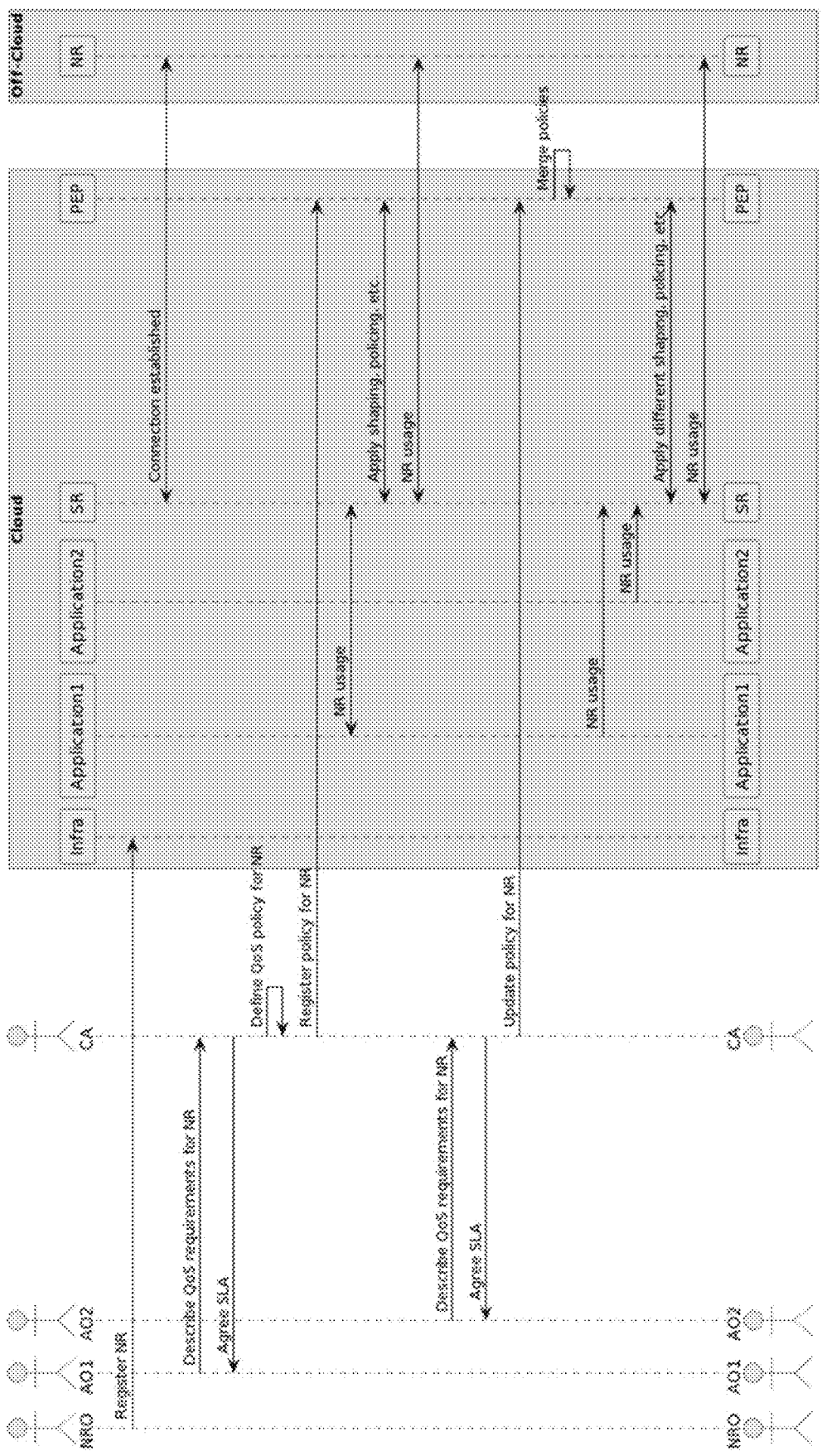
FIG. 3B is a conceptual diagram that illustrates a process for implementing a policy for constraining shared usage of limited resources across multiple applications, in accordance with one or more aspects of the present disclosure.

FIG. 3B is a conceptual diagram that is similar to FIG. 3A, but illustrates a process for implementing a policy for constraining shared usage of limited resources across multiple applications, in accordance with one or more aspects of the present disclosure. In FIG. 3B, Application Owners 1 and 2 follow a process for QoS and SLA definitions for the Network resource that is similar to FIG. 3A. In FIG. 3B, the PEP manages both sets of definitions through an updated policy for the Network Resource, where multiple applications are using the same network resource.

If the shared resource usage constraints are not implemented, problems could arise. These problems may relate to resource contention (e.g., the applications may compete for the same resources, leading to resource contention and reduced performance for one or more applications), inefficient resource usage (e.g., without proper constraints, one or more applications may use more than their fair share of the resources, leading to inefficient resource usage), and/or SLA violations (e.g., if the QoS and SLA requirements of all applications are not taken into account and enforced appropriately, it may lead to SLA violations for one or more applications). By implementing shared network resource usage constraints, the PEP can ensure that all applications get their fair share of the resources and that all applications' QoS and SLA requirements are considered and enforced appropriately, thereby avoiding the above-mentioned.

Figure 3C:
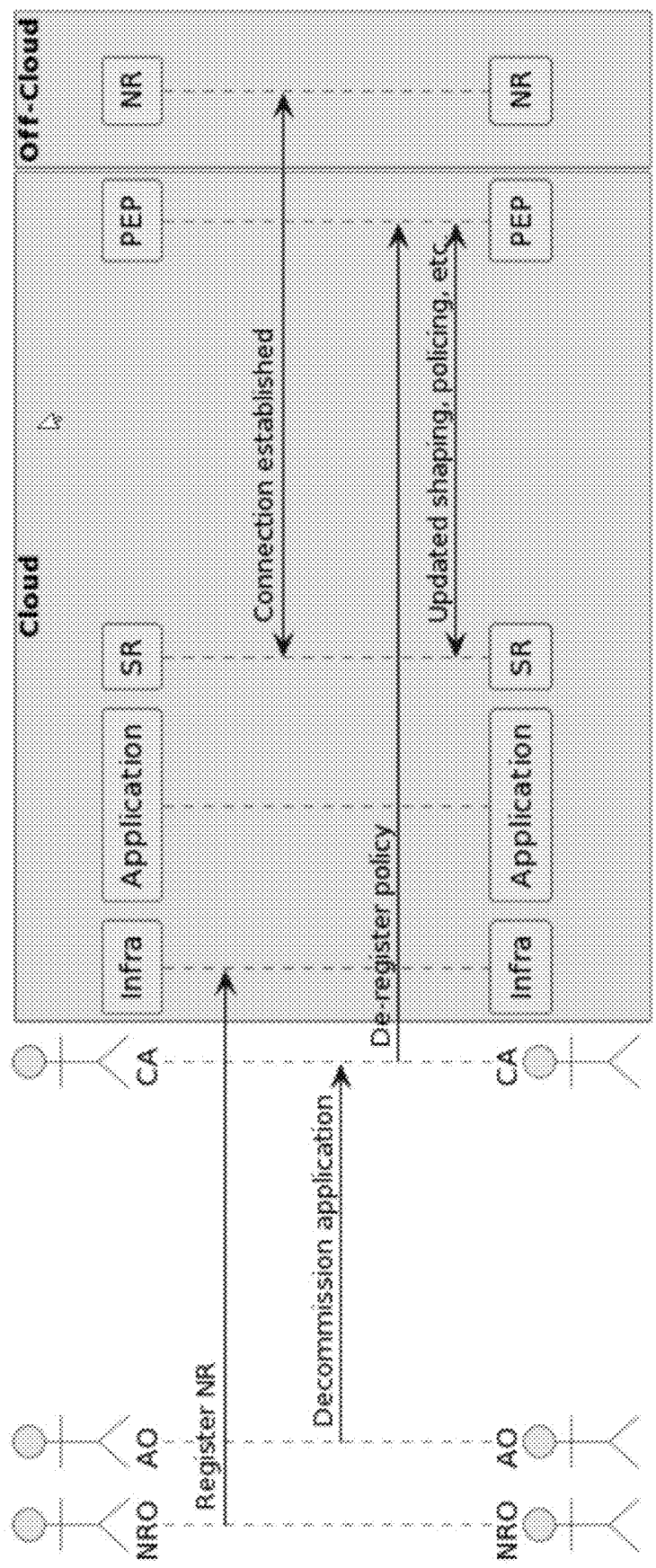
FIG. 3C is a conceptual diagram illustrating a process for decommissioning an application, in accordance with one or more aspects of the present disclosure.

FIG. 3C is a conceptual diagram illustrating a process that may be followed when an application is decommissioned, in accordance with one or more aspects of the present disclosure. When an application is decommissioned, resources used by the application should be released and made available to other applications. This includes releasing any network resources allocated to the application to ensure that the network resource is not over-provisioned or underutilized. Such application lifecycle management practices may be in place to ensure that the resources used by an application are released promptly and efficiently. For example, if, once an application is decommissioned, the new merged policy defines a lower set of features installed on the NR, the SR should ensure any no longer required features are uninstalled. Similarly, a periodic function being executed by the SR should reflect the new highest denominator of the merged policy.

Figure 4A:
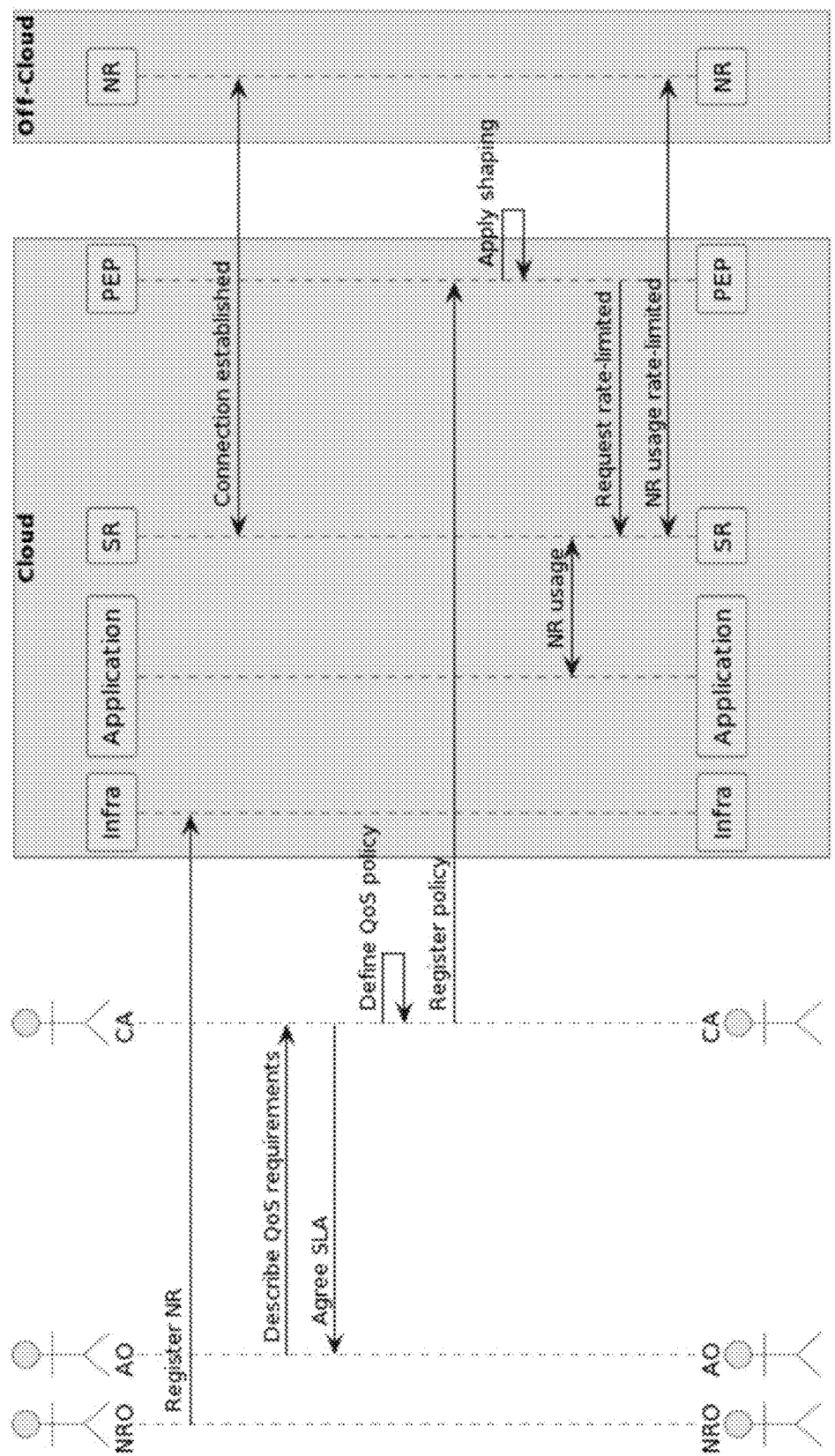
FIG. 4A is a conceptual diagram illustrating shaping processes applied to use of a shared network resource to ensure such use complies with a policy associated with that shared network resource, in accordance with one or more aspects of the present disclosure.

FIG. 4A is a conceptual diagram illustrating a process in which shaping techniques are applied to use of a shared network resource to ensure such use is in compliance with a policy associated with that shared network resource, in accordance with one or more aspects of the present disclosure. In the context of network resource management, shaping refers to the process of controlling the rate at which requests are transmitted from the SR to the NR. Shaping is used to smooth out bursts of requests and to ensure that the request rate conforms to a predetermined profile or policy. Shaping works by delaying requests so they are transmitted at a rate that conforms to the shaping policy. When the rate of incoming requests exceeds the allowed rate, requests can be stored in a buffer until the allowed rate is available. Shaping can delay request delivery, but it helps prevent congestion and ensures that the available capability is used efficiently.

Figure 4B:
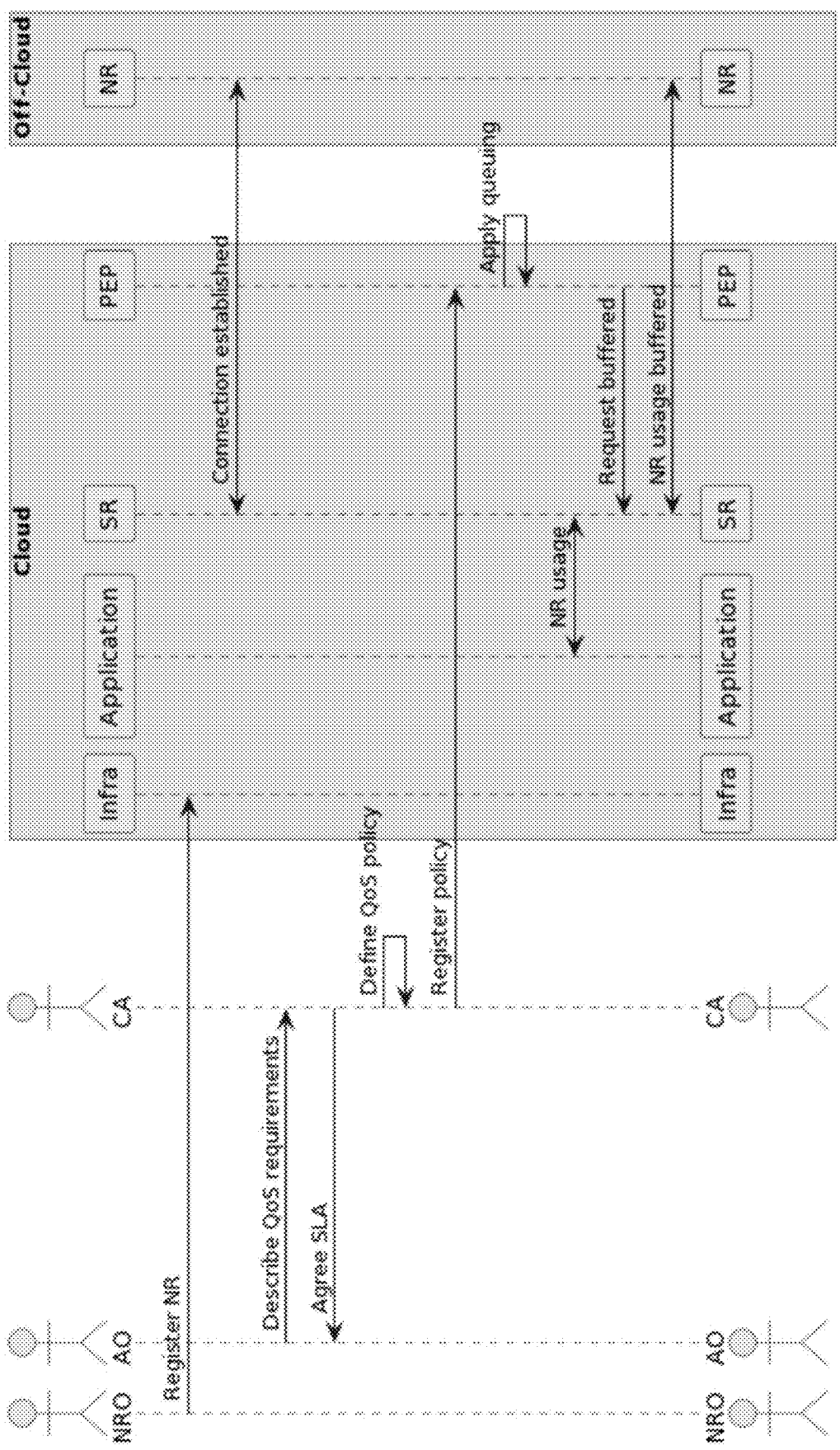
FIG. 4B is a conceptual diagram illustrating queueing processes applied to use of a shared network resource to ensure such use is in compliance with a policy associated with that shared network resource, in accordance with one or more aspects of the present disclosure.

FIG. 4B is a conceptual diagram illustrating a process in which queueing techniques are applied to use of a shared network resource to ensure such use is in compliance with a policy associated with that shared network resource, in accordance with one or more aspects of the present disclosure. In network resource management, queuing refers to storing shared resource requests in a buffer (a queue) when the SR cannot transmit them immediately. Queuing may be necessary because shared resources may receive requests at a faster rate than they can transmit them, which can cause congestion and result in dropped requests or delays (or throttled requests). When requests are queued, they are stored in a buffer and are prioritized based on their importance or other factors. The queued requests are then transmitted in the order they were received and based on their priority level, with higher-priority requests being transmitted before lower-priority requests.

Figure 4C:
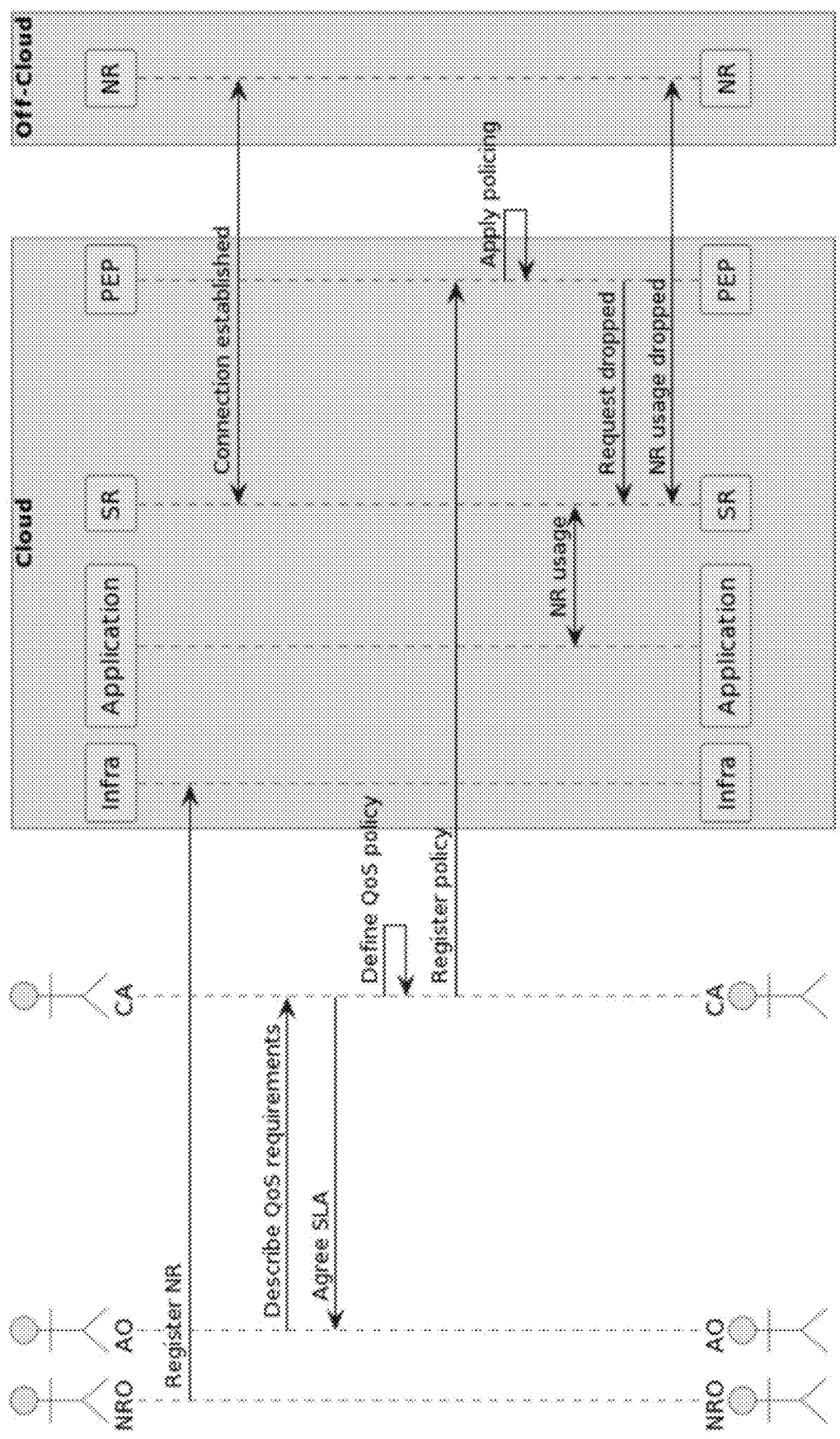
FIG. 4C is a conceptual diagram illustrating policing processes applied to use of a shared network resource to ensure such use is in compliance with a policy associated with that shared network resource, in accordance with one or more aspects of the present disclosure.

FIG. 4C is a conceptual diagram illustrating a process in which policing techniques are applied to use of a shared network resource to ensure such use is in compliance with a policy associated with that shared network resource, in accordance with one or more aspects of the present disclosure. In network resource management, policing controls the rate of requests originating from an SR by enforcing a maximum allowable request transmission rate. Policing is a form of request conditioning that involves monitoring the flow of requests on a network resource and dropping requests that exceed a certain rate or violate certain policies. Policing is often used to control network resource congestion, prevent network resource oversubscription, and enforce service-level agreements between Cloud Operators and their Application Owners.

Figure 5:
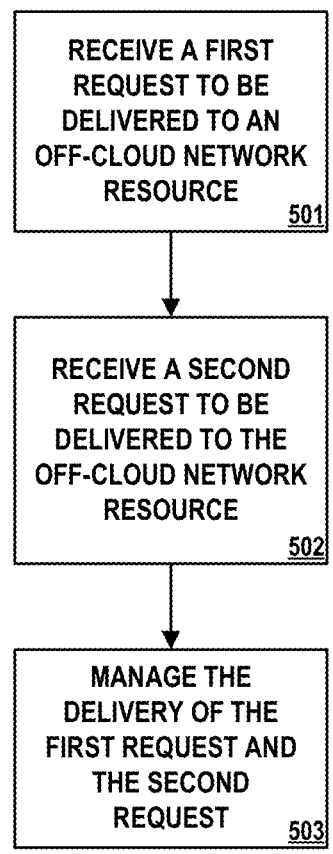
FIG. 5 is a flow diagram illustrating operations performed by an example computing system in accordance with one or more aspects of the present disclosure.

FIG. 5 is a flow diagram illustrating operations performed by an example computing system in accordance with one or more aspects of the present disclosure. FIG. 5 is described herein within the context of computing system 280 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, computing system 280 may receive, from a first application executing in a cloud environment, a first request to be delivered to an off-cloud network resource (501). For example, communication unit 285 of computing system 280 detects input and outputs information about the input to access module 292. Access module 292 determines that the input corresponds to a request received from a specific application, such as application 110A. Access module 292 further determines that the request is directed to network resource 101A of off-cloud network 102.

Computing system 280 may receive, from a second application executing in the cloud environment, a second request to be delivered to the off-cloud network resource (502). For example, communication unit 285 of computing system 280 detects input that access module 292 determines input corresponds to a request received from application 110B. Access module 292 further determines that the request from application 110B is directed to network resource 101A of off-cloud network 102.

Computing system 280 may manage, based on a policy, delivery of the first request and the second request to the off-cloud network resource (503). For example, access module 292 accesses, from storage device 290, a policy 295 that applies to network resource 101A. Access module 292 evaluates the requests from applications 110A and 110B in view of the policy 295. Access module 292 determines whether and how to apply data shaping, queuing, or policing operations to the requests by applications 110A and 110B. Access module 292 may cause communication unit 285 to communicate some or all of the requests over network 105 to network resource 101A for processing by network resource 101A.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, a limited number of devices (e.g., management system 180, computing system 280, cloud controller 151, network resources 101, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising processing circuitry and a storage device, wherein the processing circuitry has access to the storage device and is configured to:
   receive, from a first application executing in a cloud environment, a first request to be delivered to network resource that operates in an off-cloud environment;
   receive, from a second application executing in the cloud environment, a second request to be delivered to the network resource that operates in the off-cloud environment;
   generate a policy based on expected use, by the first application and the second application, of the network resource that operates in the off-cloud environment; and
   manage, based on the policy and to mitigate one or more negative effects resulting from at least one of the first request and the second request, delivery of the first request and the second request to the network resource that operates in the off-cloud environment.

2. The computing system of claim 1, wherein to generate the policy, the processing circuitry is further configured to:
   establish a service level agreement for the first application; and
   establish a service level agreement for the second application.

3. The computing system of claim 1, wherein to generate the policy, the processing circuitry is further configured to:
   generate an initial policy based on the expected use of the network resource by the first application; and
   update the initial policy based on the expected use of the network resource by the second application.

4. The computing system of claim 1, wherein to manage delivery, the processing circuitry is further configured to:
   apply one or more network management techniques to the first request and the second request.

5. The computing system of claim 4, wherein the policy includes:
   a maximum rate at which requests are to be transmitted to the network resource.

6. The computing system of claim 5, wherein to apply the one or more network management techniques, the processing circuitry is further configured to:
   control a rate at which requests are delivered to the network resource to ensure that the rate does not exceed the maximum rate.

7. The computing system of claim 5, wherein to apply the one or more network management techniques, the processing circuitry is further configured to:
   queue the second request in a buffer to avoid sending requests to the network resource at a rate faster than the maximum rate.

8. The computing system of claim 5, wherein to apply the one or more network management techniques, the processing circuitry is further configured to:
   drop requests that would cause requests sent to the network resource to exceed the maximum rate.

9. The computing system of claim 1, wherein the network resource is included in a plurality of network resources that operate in the off-cloud environment, and wherein the processing circuitry is further configured to:
   generate a south-to-north policy for data flows from the plurality of network resources to the first application.

10. The computing system of claim 9, wherein to generate the south-to-north policy, the processing circuitry is further configured to:
    generate the south-to-north policy based on expected data flows from each of the network resources to the first application.

11. The computing system of claim 10, wherein the processing circuitry is further configured to:
    manage, based on the south-to-north policy, data flows to the first application.

12. The computing system of claim 11, wherein to manage the data flows to the first application, the processing circuitry is further configured to:
    apply one or more network management techniques.

13. The computing system of claim 12, wherein to apply the one or more network management techniques, the processing circuitry is further configured to:
    shape the data flows, queue data from the data flows, and police the data flows.

14. The computing system of claim 11, wherein to manage the data flows, the processing circuitry is further configured to:
    scale cloud infrastructure resources of the cloud environment available to the first application.

15. A method comprising
    receiving, by a network management system and from a first application executing in a cloud environment, a first request to be delivered to a network resource that operates in an off-cloud environment;
    receiving, by the network management system and from a second application executing in the cloud environment, a second request to be delivered to the network resource that operates in the off-cloud environment;
    generating, by the network management system, a policy based on expected use of the network resource that operates in the off-cloud environment by the first application and the second application; and
    managing, by the network management system and based on a policy, delivery of the first request and the second request to the network resource that operates in the off-cloud environment to mitigate one or more negative effects resulting from at least one of the first request and the second request.

16. The method of claim 15, wherein generating the policy includes:
    establishing a service level agreement for the first application; and
    establishing a service level agreement for the second application.

17. The method of claim 15, wherein generating the policy includes:
    generating an initial policy based on expected use of the off cloud network resource by the first application; and
    updating the initial policy based on expected use of the off cloud network resource by the second application.

18. Non-transitory computer-readable media comprising instructions that, when executed, configure processing circuitry of a computing system to:
    receive, from a first application executing in a cloud environment, a first request to be delivered to a network resource that operates in an off-cloud environment;
    receive, from a second application executing in the cloud environment, a second request to be delivered to the network resource that operates in the off-cloud environment;
    generate a policy based on expected use of the network resource that operates in the off-cloud environment by the first application and the second application; and
    manage, based on the policy and to mitigate one or more negative effects resulting from at least one of the first request and the second request, delivery of the first request and the second request to the network resource that operates in the off-cloud environment.

* * * * *